[19] United States Patent

Janusas

[11] Patent Number: 5,200,753
[45] Date of Patent: Apr. 6, 1993

[54] MONOPULSE RADAR JAMMER USING MILLIMETER WAVE TECHNIQUES

[75] Inventor: Saul Janusas, Seacliff, N.Y.

[73] Assignee: Grumman Aerospace Corporation, Bethpage, N.Y.

[21] Appl. No.: 837,882

[22] Filed: Feb. 20, 1992

[51] Int. Cl.[5] .............................. G01S 7/38; H04K 3/00
[52] U.S. Cl. ........................................................ 342/14
[58] Field of Search ................................. 342/14, 13

[56] References Cited

U.S. PATENT DOCUMENTS

| | | | |
|---|---|---|---|
| 4,454,513 | 6/1984 | Russell | 342/174 |
| 4,638,316 | 1/1987 | Austin et al. | 342/14 |
| 4,700,191 | 10/1987 | Manor | 342/13 |
| 4,743,904 | 5/1988 | Morton et al. | 342/14 |
| 4,890,109 | 12/1989 | Gagliardi | 342/14 |
| 4,937,582 | 6/1990 | Mohuchy | 342/188 |

Primary Examiner—John B. Sotomayor
Attorney, Agent, or Firm—Pollock, VandeSande & Priddy

[57] ABSTRACT

A first extended interactive amplifier operates at a fixed frequency while a second such amplifier sweeps across a frequency range. The respective extended interactive amplifiers produce individual signals which are fed through separate waveguides to corresponding horns of an antenna. The frequency separation of the produced frequencies is made to match a threat radar's IF channels. By setting the jamming signal frequencies well above the threat radar band, the mixers of the threat radar receiver generate grossly unbalanced angle error signals. This disturbs the capability of the threat from homing in on the jamming site. Accordingly, the resulting jamming signal provides excellent electronic countermeasures.

9 Claims, 2 Drawing Sheets

MONOPULSE RADAR JAMMER USING MILLIMETER WAVE TECHNIQUES

FIELD OF THE INVENTION

The present invention relates to radar jamming systems and more particularly to such a system which transmits jamming signals in the millimeter wave region.

BACKGROUND OF THE INVENTION

Very little success has been achieved in jamming monopulse tracking radar systems. This is mainly due to the fact that the angle tracking channels are designed so that they are matched in phase and amplitude so that jamming is canceled. Also, if a sufficiently strong jamming signal masks the radar skin return, the monopulse tracker can track on the jamming signals.

Conventional systems such as Cross-Eye, Cross-Pol, or skirt jamming attempt to capitalize on minute radar system mismatches and have shown only marginal success. These methods require extremely stable and expensive equipment.

BRIEF DESCRIPTION OF THE PRESENT INVENTION

Since the monopulse tracking radar circuits can be made very well matched in the band of interest (e.g. C, X, and Ku bands), they are invulnerable to jammers operating in these bands.

However, experiments in the laboratory indicate that millimeter wave signals when applied to the lower band circuits, propagate through the matched channels, but arrive at the mixers extremely mismatched. This is due to millimeter wave signals propagating through oversized wave guides creating random unpredictable modes. Also, due to wave guide bends, polarization of the millimeter signal is also changing unpredictably.

The unpredictable millimeter signal behavior results in extreme unbalance in the angle tracking circuits causing the monopulse radar antenna to slew off the jammer.

The mixers in the radar receiver have considerable sensitivity to millimeter waves and as a result generate grossly unbalanced angle error signals. To enhance the generation of large angle error jamming signals, two or more tones, at millimeter wave frequencies, are transmitted. The frequency separation of these tones is made to match the threat radar's IF channels. For example, if a radar threat has an IF of 60 mhz, the two millimeter wave jamming signals must be separated by 60 mhz.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
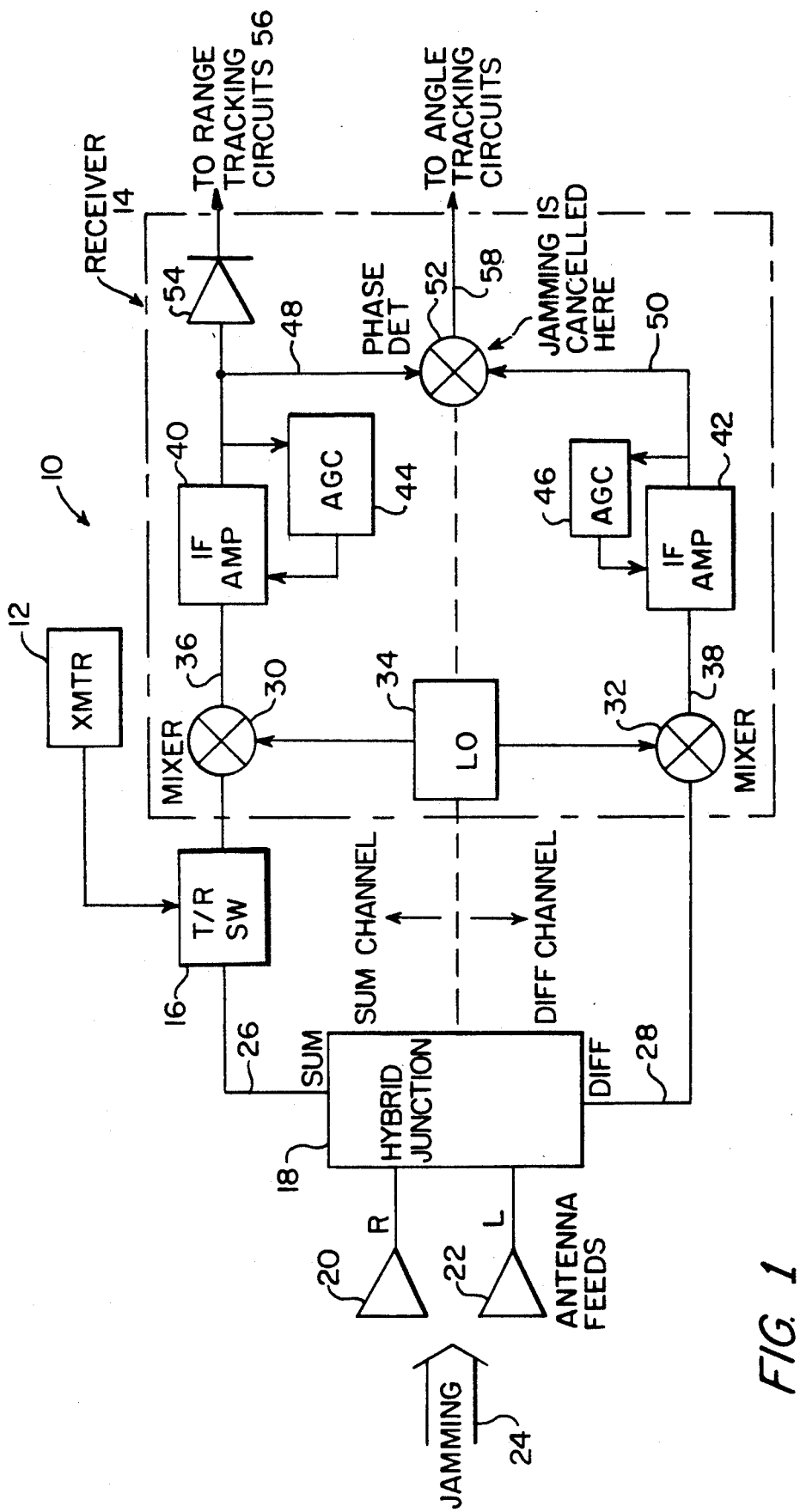
FIG. 1 is a basic block diagram of a typical monopulse tracking radar.

FIG. 1 illustrates a prior art typical monopulse tracking radar generally indicated by reference numeral 10. The radar includes a transmitter 12 and a receiver 14, the latter being shown in greater detail. A T/R switch 16 switches between transmit and receive modes relative to antenna feed 20 and 22. These later mentioned feeds indicate a single plane of the antenna, it being understood that a second set of feeds are employed for an orthogonal plane, along with a second set of corresponding transmitter and receiver circuits. A conventional hybrid junction 18 generates sum and difference signals along lines 26 and 28. The upper illustrated section of receiver circuitry represents a sum channel while the lower represents a difference channel.

During a receive mode, mixer 30 is provided with a sum signal from the right and left antenna feeds. The mixer has a second input from a local oscillator 34 thereby generating an IF frequency at mixer output 36. A comparable situation occurs for mixer 32 installed in the difference channel. The mixer 32 has a first input connected to the difference signal between the right and left antenna feeds while a second mixer input is connected to the local oscillator 34. This generates an intermediate frequency at the output 38 of mixer 32.

The outputs from mixers 30 and 32 are respectively fed to IF amplifiers 40 and 42, each equipped with automatic gain control circuits 44 and 46 in conventional fashion. The intermediate frequency signals from the IF amplifiers are connected via corresponding lines 48 and 50 to the phase detector 52. Since the sum and difference channels are perfectly balanced, the effect of an incoming jamming signal at 24 becomes canceled by the phase detector 52. Therefore, the output of the phase detector 52 provides accurate angle tracking signals. The output from IF amplifier 40 is conditioned by circuit 54 which provides and input signal to range tracking circuits along connecting lead 56.

Figure 2:
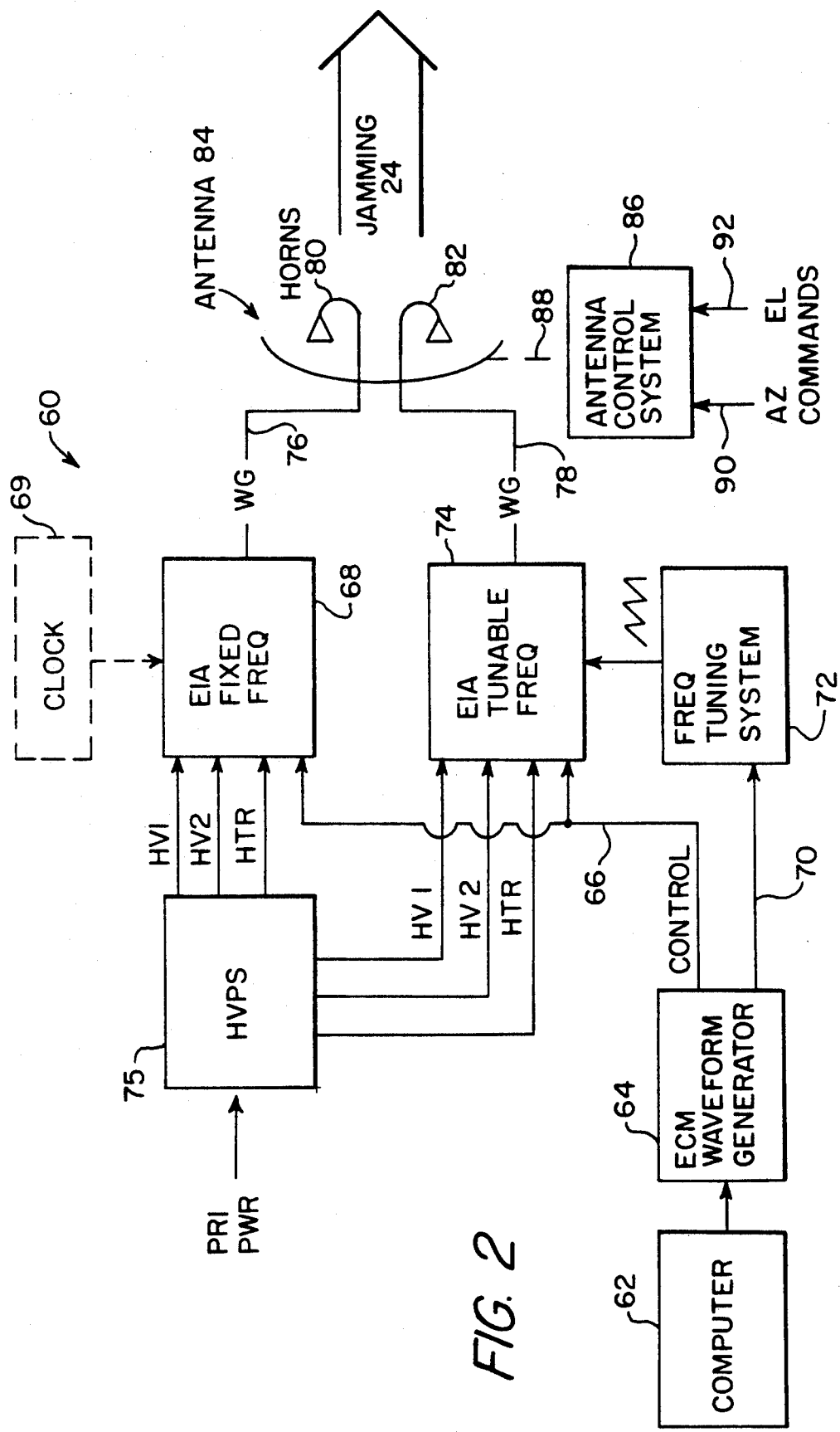
FIG. 2 is a block diagram of a high power millimeter wave jamming circuit in accordance with the present invention.

Referring to FIG. 2, a block diagram of the present jamming system 60 is illustrated. In order to generate large angle error jamming signals 24 at the output of this circuit that will be effective against a radar such as shown in FIG. 1, two millimeter wave frequency signals are transmitted. The frequency separation of these signals is made to match the threat radars IF channels.

A computer 62 stores footprint data from a host of likely radar signal emitters, such as an incoming radar guided missile. Electrical counter measure (ECM) digital data is generated for such a particular emitting source and the waveform generator 64 performs a digital/analog conversion to generate a corresponding analog control signal. A first waveform generator control signal is connected in parallel to a fixed frequency extended interactive amplifier (EIA) 68 which may be a vacuum tube klystrom. A second output from generator 64 is connected via line 70 to a frequency tuning system 72 which develops a scanning signal such as a sawtooth signal as illustrated at its output. The scanning signal is then fed to a second extended interactive amplifier 74 which generates a tuneable frequency due to the modulating effect of the tuning system 72 and its output signal such as a sawtooth. In order to insure that the first mentioned EIA 68 is stabilized, a clock 69 may be connected at its input. In order to drive each EIA, a high voltage power supply (HVPS) 75 receives primary power and distributes it along individual power input lines HV1, HV2, HTR of EIAs 68 and 74.

Individual waveguides 76 and 78 carry the respective fixed and scanning signals from EIAs 68 and 74 to respective horns 80 and 82 of a jamming antenna 84. The result will be the transmission of two jamming tones, at different frequencies, as generally indicated by reference numeral 24. In order to properly point the antenna 84 toward an incoming threat, a conventional antenna control system 86 is provided with azimuth and elevation commands 90 and 92 from a surveillance radar system at the jamming site. This is particularly important if the jammer is installed on-board a ship which constantly changes its position due to sea action.

The individual frequency components of the jamming signal are operative about a fixed frequency that greatly exceeds the operating bands of an approaching monopulse tracking radar. In particular, if such a tracking radar is operating at normal bands of interest (e.g. C, X, and Ku bands), the frequencies generated by the present invention should be millimeter wave signals which will create random unpredictable modes in the receiver circuit of an incoming tracking radar. Unpredictable behavior will result in extreme imbalance in angle tracking circuitry thereby causing a monopulse tracking radar antenna to slew off the jammer thus protecting the jamming site. The frequency separation of the fixed and tuneable frequencies generated by present jamming circuitry is made to match the threat radar's IF channels. For example, if a radar threat has an IF of 60 mhz, the two millimeter wave jamming frequencies must be separated by 60 mhz.

Thus, as will be appreciated, the present invention greatly increases the electronic countermeasure (ECM) capability of a jammer against an incoming threat.

It should be understood that the invention is not limited to the exact details of construction shown and described herein for obvious modifications will occur to persons skilled in the art.

I claim:

1. A radar jamming system comprising:
   a fixed frequency means outputting a millimeter wave fixed signal;
   a tunable frequency means outputting a millimeter wave variable signal;
   means connected to an input of the tunable means for producing a scanning tuning signal;
   first and second antenna horns for respectively transmitting the output signals from the fixed and tunable frequency means, simultaneously; and
   first and second waveguides connected between the fixed and tunable means and their corresponding antenna horns;
   wherein a range of transmitted scanned frequencies relative to the fixed frequency include an intermediate frequency of a distant radar receiver to be jammed, the receiver having a local oscillator operating at a frequency substantially lower than the fixed frequency.

2. The jamming system set forth in claim 1 wherein the fixed and tunable frequency means are vacuum tube extended interactive amplifiers.

3. The jamming system set forth in claim 2 together with means for storing footprint data regarding local oscillator frequency of the distant radar to be jammed;
   an electronic counter measures (ECM) generator having its input connected to the storing means for performing a digital to analog conversion of the data; and
   means connecting the output of the ECM generator to the inputs of the fixed and tunable frequency means for controlling the operating frequencies of these means.

4. Claim 3 wherein the horns are mounted to an antenna structure, and wherein means are connected to the antenna structure for varying the azimuth and elevation thereof so as to align the antenna structure with the direction of a transmitted signal from the distant radar.

5. A radar jamming system comprising:
   a tunable fixed frequency extended interactive amplifier outputting a fixed millimeter wave signal;
   a second frequency extended interactive amplifier outputting a tunable variable millimeter wave signal;
   means connected to an input of the tunable extended interactive amplifier for producing a scanning output signal centered about the fixed frequency.
   first and second antenna horns for respectively transmitting the output signals from both interactive amplifiers; and
   first and second waveguides connected between the extended amplifiers and corresponding antenna horns;
   wherein a range of scanned frequencies about the fixed frequency include an intermediate frequency of a distant radar receiver to be jammed.

6. The jamming system set forth in claim 5 together with means for storing footprint data regarding local oscillator frequency of a distant radar to be jammed;
   an electronic counter measures (ECM) generator having its input connected to the storing means for performing a digital to analog conversion of the data; and
   means connecting the output of the ECM generator to the inputs of the amplifiers for controlling the operating frequencies thereof;
   wherein the horns are mounted to an antenna structure, and wherein means are connected to the antenna structure for varying the azimuth and elevation thereof so as to align the antenna structure with the direction of a transmitted signal from the distant radar.

7. The jamming system set forth in claim 6 wherein the interactive amplifiers are of the vacuum tube klystron type.

8. A method of jamming distant radar comprising the steps of:
   detecting a signal transmitted from the distant radar;
   generating an electronic counter measure control waveform dependent upon the detected signal;
   increasing the frequency and power of the control waveform to form fixed and variable frequency components operating at substantially higher frequencies than the intermediate frequency of the distant radar receiver;
   tuning the frequency of the variable frequency component so as to scan about the fixed frequency within a range of likely interference with intermediate frequencies of the distant radar receiver;
   transmitting both frequency components as millimeter microwave signals which unbalance the mixers of the distant radar receiver.

9. The method set forth in claim 8 together with the steps of transmitting the millimeter microwave signals from individual horns of an antenna; and controlling the azimuth and elevation of the antenna in accordance with an approaching aerobody carrying the distant radar.

* * * * *